July 18, 1950          J. BOLSEY          2,515,330
CINEMATOGRAPHIC CAMERAS HAVING FADING MEANS
Original Filed March 26, 1946
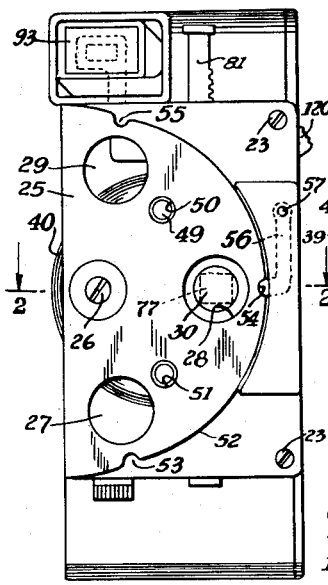
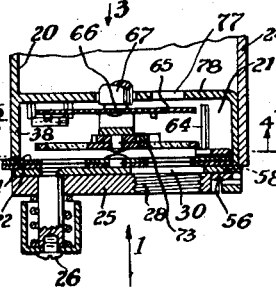
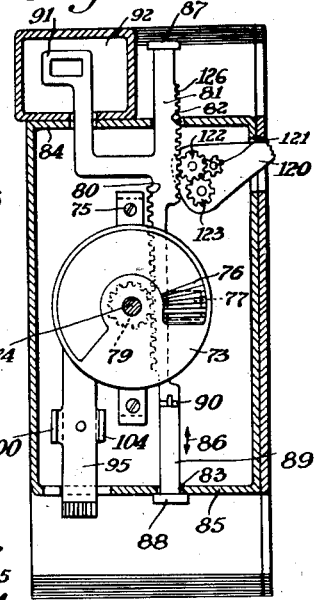
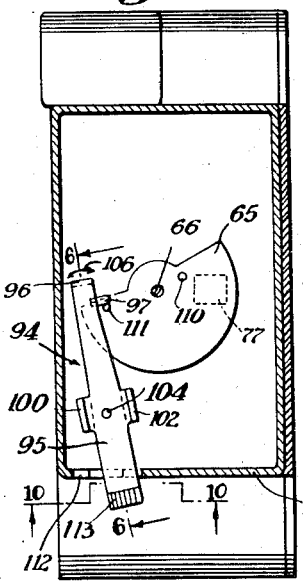
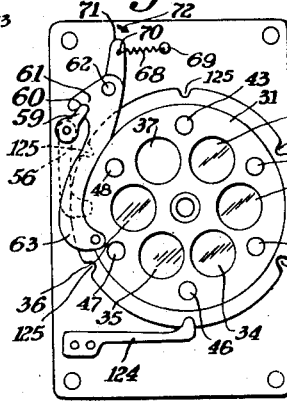
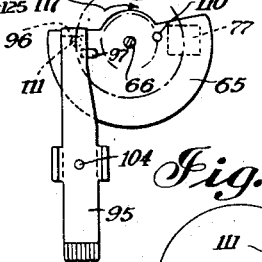
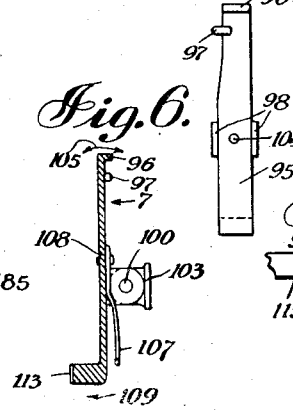
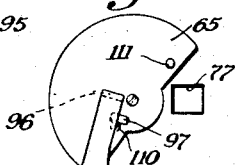
INVENTOR:
Jacques Bolsey Patented July 18, 1950

2,515,330

UNITED STATES PATENT OFFICE 2,515,330

CINEMATOGRAPHIC CAMERA HAVING FADING MEANS

Jacques Bolsey, New York, N. Y.

Original application March 26, 1946, Serial No. 657,282, now Patent No. 2,462,302, dated February 22, 1949. Divided and this application December 15, 1948, Serial No. 65,473.

4 Claims. (Cl. 88—17)

My present application is a division of my copending U. S. patent application Serial No. 657,282, entitled Cinematographic Cameras and filed March 26, 1946, now United States Patent Number 2,462,302, issued February 22, 1949.

My present invention relates to cinematographic cameras and more particularly to cinematographic cameras provided with movable lens carrying turrets.

It is an object of my present invention to provide in a cinematographic camera of the above type a filter arrangement which is extremely simple in construction and operation.

It is a further object of my present invention to provide blocking means which prevent operation of the camera shutter if none of the lenses is in proper picture taking position.

It is another object of my present invention to provide a fading device of extremely simple construction which can be operated either by hand or by the spring driven mechanism used for film transportation.

Still a further object of my present invention consists in shutter operating means which are constructed so that it is possible to make by operation of one single release member either motion picture exposures or instantaneous and time exposures.

Still another object of my present invention consists in a cinematographic camera constructed so as to embody all above listed means in combination.

With the above objects in view, my present invention mainly relates to cinematographic cameras and consists partly in combination of a series of elements namely, a camera housing having a front wall, an exposure aperture in this front wall, a lens carrying turret movably mounted on the mentioned front wall in such a manner that the lenses carried by this turret are adapted to move during movement of the turret past the mentioned exposure aperture, a turnable filter disc pivoted to the above mentioned front wall, a plurality of filters in this filter disc arranged equidistant from the pivoting axis of this disc so that the filters might be turned consecutively one after the other behind the mentioned exposure aperture, an observation opening in the front wall, and filter markings on the filter disc arranged so as to appear during turning of the filter disc consecutively one after the other in the above mentioned observation opening and to indicate the filter located at that time behind the exposure aperture.

In accordance with a preferred embodiment of my invention, I combine with the above arrangement a series of additional observation openings in the above mentioned lens carrying turret, arranged so that one of these additional observation openings is located in front of the above mentioned observation opening in the front wall of the camera each time one of the lenses carried by the turret is located in front of the exposure aperture in the front wall. In this way, the filter markings on the filter disc appearing during turning of the filter disc consecutively one after the other in the observation opening in the front wall are visible through one of the above mentioned additional observation openings in the lens carrying turret when the same is in operative position, i. e. when one of the lenses carried by the turret is located in front of the exposure aperture in the front wall.

It is advisable to make the entire front wall of the camera removable and to mount the turret head and filter disc on this front wall so that they form together a single unit which can be detached from the camera housing whenever desired.

It is also advisable to provide in a side wall of the camera housing a longitudinal slot arranged so that the edge of the turnable filter disc described above projects through this slot thereby enabling turning of the filter disc by means of this projecting edge portion.

Another feature of my new camera consists in the combination of a lens carrying turret of the type described above, a shutter mechanism arranged within the camera housing, and blocking means arranged also within the camera housing and constructed so as to be operated by the turret and to move into the path of a movable member of the shutter mechanism when none of the lenses carried by the turret is located in front of the exposure aperture in the front wall of the camera housing, thus permitting operation of the shutter mechanism only when one of the lenses carried by the turret is located in front of the exposure aperture.

My new camera is also equipped with a fading arrangement comprising in combination a fading member mounted within the camera housing movably to and fro past the exposure aperture in the front wall of the camera housing, and a longitudinal operating member mounted within said camera housing slidably in axial direction and constructed so as to engage said fading member and operate the same during its sliding movement.

In accordance with a preferred embodiment of my present invention, the longitudinal operating member described above has at both ends projecting end portions reaching through corresponding openings in the camera housing so that this operating member and the fading member operated by the same can be moved by pushing against one or the other of the projecting end portions of the longitudinal operating member in axial direction of the same.

It is also advisable to provide in combination with a longitudinal operating member of the type described above, hinge means connecting one of the above mentioned projecting end portions with the operating member so as to enable turning of said projecting end portion relative to the longitudinal operating member, thus preventing sliding movement of the longitudinal operating member while the projecting end portion is in bent position.

In order to enable permanent observation of the position of the fading member described above, I provide my new camera with a viewfinder arrangement provided with a viewfinder window and secure to the longitudinal operating member operating the fading member an indicating member which is constructed so as to move during operations of said fading member by said longitudinal member behind said viewfinder window of said viewfinder arrangement, thus indicating in the viewfinder window the degree of fading obtained by the fading member.

The above described fading arrangement might be operated manually. However, if the camera is equipped with spring driven means for moving the film past the exposure aperture, it is advisable to arrange a motion transmitting member, e. g. a gear train operated by these spring driven means and adapted to engage the longitudinal operating member, whenever desired, so as to slide the same to and fro in axial direction and to operate the fading member.

My new camera is adapted not only for production of motion pictures, but it is possible to take with the same also single pictures. For these purposes, I provide the camera with a rotatable shutter arranged within the camera housing behind the exposure aperture, two stop means arranged on said rotatable shutter at different distances from the axis of rotation of said shutter; and a shutter operating member arranged and constructed so as to be movable in one plane, engaging during movement in the plane the stop means on the rotatable shutter and to cause thereby instantaneous and time exposures by the shutter member and to be movable normal to said plane so as not to engage any of the stop means thus enabling the rotatable shutter to rotate freely and to cause motion picture exposures of a film passing inside said camera housing past the exposure aperture in the front wall of the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of a cinematographic camera according to my present invention, seen in direction of arrow 1 of Fig. 2;

Fig. 2 is a cross section through the camera shown in Fig. 1, along line 2—2 of Fig. 1;

Fig. 3 is a rear view of the front wall of the camera housing of the camera shown in Figs. 1 and 2, seen in direction of arrow 3 of Fig. 2;

Fig. 4 is a longitudinal section through the camera shown in Figs. 1 to 3, along line 4—4 of Fig. 2;

Fig. 5 is a longitudinal section through the camera shown in Figs. 1 to 4, along line 5—5 of Fig. 2;

Fig. 6 is a longitudinal section through the shutter operating lever forming part of the camera shown in Figs. 1 to 5, along line 6—6 of Fig. 5;

Fig. 7 is a rear view of the shutter operating lever shown in Fig. 6, seen in direction of arrow 7 of Fig. 6;

Figs. 8 and 9 are schematic illustrations of the shutter operating means in different positions; and Fig. 10 is a partial bottom view of the shutter operating means, partly in section along line 10—10 of Fig. 5.

As shown in Figs. 1 and 2, my new camera comprises a camera housing 20 of well known type equipped at its front end with a shutter compartment 21 which is closed in usual manner by a removable front wall 22 detachably secured to the camera housing 20 by means of screws 23. The housing 20 itself is closed by the camera cover 24.

I wish to stress that the construction of the film transporting means arranged in the housing 20 itself are of well known type and therefore are neither shown nor described in detail. My present invention as defined above relates only to arrangements in the front compartment 21 and therefore, only these arrangements are shown in the drawing described below.

A turnable turret 25 is secured by means of the pivot 26 in well known way to the front wall 22 of the camera. This turret carries the lenses 27, 28 and 29. The front wall 22 is provided as usual with an exposure aperture 30 which, as shown in Fig. 1 in dotted lines, is located behind lens 28.

In accordance with my present invention, I provide immediately behind the front wall 22 a turnable filter disc 31 as clearly shown in Fig. 3. This filter disc is provided with six filters 32 to 37 having different characteristics.

In order to enable operation of this filter disc 31 in a simple way, I provide in the side wall 38 of the camera housing 20 a longitudinal slot 39 through which the edge 40 of disc 31 projects. Thus, it is possible to turn the disc 31 about its pivot 41 simply by moving the projecting edge portion 40 of the disc in direction of arrow 42.

For proper operation of the camera it is necessary to know which filter is located behind the picture taking lens, i. e. which filter is located behind the exposure aperture 30. For this purpose, the filter disc 31 is provided on its front wall with filter indicating markings 43 to 48 which are arranged equidistant from the pivot 41 of disc 31 so that each time one of the filters 32 to 37 is located behind the exposure aperture 30 the corresponding filter marking is located behind an observation aperture 49 provided in front wall 22 of the camera housing 20.

Of course, it is impossible to see this observation opening 49 in the front wall 22 through the turret 25. Therefore, I provide in this turret two additional observation openings 50 and 51, arranged so that each time one of the lenses 27 and 28 is located in front of the exposure aperture 30, one of the additional observation openings 50 and 51, respectively, is located in front of the observation opening 49 in the front wall 22. I wish to stress that if camera lens 29 is in front of the exposure aperture 30 no additional observation opening in turret 25 is necessary, since in this position the turret 25 will not cover the observation opening 49 in the front wall 22 of the camera housing.

In order to facilitate proper positioning of the filter disc 31, I provide in the edge thereof six notches 125 each corresponding to one of the filters 32 to 37; these notches cooperate with the spring member 124 in well known manner so as to indicate when the disc is in proper position and to prevent unwanted turning of the disc.

In order to prevent operation of the camera, i. e. exposure of film when the turret 25 is not in proper position, I provide along the outer edge 52 of the turret three notches 53, 54 and 55 which are arranged so as to engage the lever 56 turnably secured at 57 to the front wall 22 of the camera, when the turret 25 is in proper operative position with one of the lenses 27 to 29 located in front of the exposure aperture 30.

This lever 56 is connected by means of the turnable pivot 58 with an operating arm 59. This operating arm 59, in turn, engages a notch 60 provided in the shutter blocking lever 61 pivoted to the front wall 22 by means of pivot 62. This shutter blocking lever 61 is provided at the end of its arm 63 with a blocking pin 64 adapted to turn into and out of the path of the rotatable shutter 65 firmly secured at 66 to the driving shaft 67. Spring 68 is secured at its one end 69 to front wall 22 and its other end 70 to arm 71 of the shutter blocking lever 61. This spring 68 tends to turn the blocking lever 61 in direction of arrow 72, i. e. so as to move pin 64 out of the path of the rotatable shutter 65.

This shutter blocking mechanism operates as follows:

When the turret 25 is in proper position shown in Fig. 1, lever 56 is in the position shown in Fig. 1 and does not move the blocking lever 61 in counter-clockwise direction into the path of the rotatable shutter 65. Thus, this blocking lever 61 is free to be turned by spring 68 in direction of arrow 70 into the inoperative position shown in Fig. 2. In such inoperative position of the blocking lever 61 the rotatable shutter 65 is free to turn undisturbed by the blocking pin 64.

When the turret 25 is in incorrect position, i. e. no lens is located in front of exposure aperture 30, the lever 56 is forced by the turret edge to turn in counter-clockwise direction thus forcing the blocking lever 61 to turn against the direction of arrow 72; this results in turning of the blocking pin 64 into the path of shutter 65 preventing movement of the same.

In accordance with my present invention, I arrange in the front compartment 21 of the camera housing 20 also a fading arrangement of an entirely new type. This fading arrangement comprises a turnable fading disc 73 mounted by means of pivot 74 turnably to the bridge member 75 so that the grey wedge 76 is adapted to turn in front of the second exposure aperture 77 provided in the partition wall 78 of the camera housing 20.

This fading disc 73 is equipped with a pinion 79 firmly secured to the disc and engaging a toothed rack 80 forming part of the longitudinal operating member 81. This operating member 81 is passing through the openings 82 and 83 provided in the top wall 84 and the bottom wall 85, respectively, of the camera housing 20. This operating member is freely slidable in direction of arrow 86 and its movement is only limited by the operating knobs 87 and 88 provided at both ends of the operating member 81.

As shown in Fig. 4, the lower end portion 89 is attached to the operating member 81 by means of a hinge 90 so that if the operating member 81 is pushed into its lowermost position, the portion 89 can be bent backward, thus locking the operating member 81 in this position.

It is evident that it is easily possible to manually turn the fading disc 73 by simply pushing either knob 87 downward or knob 88 upward; such pushing movement will result in turning of disc 73 and movement of the fading grey wedge 76 past the exposure aperture 77.

If it is desired to operate the above described fading arrangement by the spring means transporting the film, an additional tooth rack 126 is provided on member 81 and a turnable operating lever 120 is arranged so that either one of the gears 122 and 123 or none of them engages the teeth of rack 126. The gears 122 and 123 are driven by pinion 121 rotated by the spring means mentioned above in opposite direction. It is evident that if pinion 121 rotated in counter-clockwise direction and the operating lever is in the position shown in Fig. 4, gear 122 moves the operating member 81 upwards. If, however, the operating lever 120 is tilted downwards, gear 123 will engage rack 126 and move member 81 in downward direction.

In order to enable permanent observation and control of the position of the fading disc 73 and the fading grey wedge 76, I combine with the longitudinal operating member 81 an indicating member 91 which reaches into the viewfinder tube 92 and appears as clearly shown in Fig. 1 behind the viewfinder window 93. Thus, this indicating member 91 will move up and down together with the operating member 81 and its position will always be an indication of the position of this operating member and the fading means operated by the same.

As mentioned above, I provide also in accordance with my present invention a shutter operating arrangement 94 of entirely new type, clearly shown in Figs. 5 to 10.

The main element of this arrangement is the operating lever 95 itself which has the shape shown in Figs. 5 to 7. As shown, the lever 95 is provided with two operating projections 96 and 97. Furthermore, this operating lever is provided with two lug-shaped bearing extensions 98 and 99 which are attached by means of pivots 100 to the two bearing brackets 101 and 102 forming part of a yoke-shaped bearing member 103 turnably pivoted at 104 to the partition wall 78.

Thus, the operating lever 95 is turnable on the one hand about the pivots 100, as indicated by arrow 105 in Fig. 6, and on the other hand about pivot 104, as indicated by arrow 106 in Fig. 5. As shown in Fig. 6, a spring 107 is secured at 108 to the operating lever 95 and arranged so as to engage with its free end the camera wall, thus tending to turn the lever 95 in direction of arrow 109.

The shutter operating projections 96 and 97 of the shutter operating lever 95 cooperate with two operating pins 110 and 111 arranged on the rotatable shutter 65 at different distances from the pivoting axis 66 of this shutter.

The shutter operating lever 95 projects through a slot 112 in the bottom wall 85 of the camera housing 20 and is provided at its end with an operating knob 113. The slot 112 has the shape shown in Fig. 10, i. e. is provided with a middle portion 114 which is deeper than the two side portions 115 and 116.

This shutter operating mechanism operates as follows:

In order to obtain free rotating movement of the shutter 65, i. e. in order to obtain motion picture exposures, the operating lever 95 is moved into its middle position and the knob 113 is pressed downward, against direction of arrow 109, forcing the lever against action of spring 107 into the deeper middle portion 114 of slot 112. In this position, the lever 95 will turn about the pivots 100 against direction of arrow 109 and thus both projections 96 and 97 forming part of the lever 95 will move out of the path of the operating pins 110 and 111 arranged on the rotatable shutter 65; thus, these pins 110 and 111 will be free to turn together with the shutter 65 unhindered by the shutter operating lever 95. It is evident that this will result in an uninterrupted series of motion picture exposures.

In order to terminate such motion picture exposures, it is only necessary to release the operating knob 113 and the operating lever 95 will be turned by spring 107 in direction of arrow 109 back into its initial middle upper position shown in Fig. 8.

In order to obtain one single instantaneous exposure, it is only necessary to move the operating lever 95 from its position shown in Fig. 8 into its position shown in Fig. 5. This will result in release of the operating pin 111 from the operating projection 96 and the rotatable shutter 65 will be free to turn in direction of arrow 117 until the operating pin 111 abuts against the operating projection 97 on lever 95 as shown in Fig. 5. During this turning movement, the exposure aperture 77 is exposed once for a short time, thus resulting in instantaneous exposure of the film passing behind it.

In order to have the operating lever 95 again in its initial position, it is only necessary to turn it from its position shown in Fig. 5 into its position shown in Fig. 8: during such turning movement of lever 95, pin 111 will be released from projection 97 and will abut, as shown in Fig. 8, against projection 96 without, however, exposing during such movement the exposure aperture 77.

In order to obtain one single time exposure, it is only necessary to turn the operating lever 95 from its position shown in Fig. 8 into its position shown in Fig. 9: Such movement of lever 95 will result in release of the operating pin 111 from projection 96 and turning of the shutter from its position shown in Fig. 8 into its position shown in Fig. 9 in which it is held by pin 110 abutting against projection 97. As clearly shown in Fig. 9, in this position the exposure aperture 77 is open, not covered by shutter 65. After making a time exposure of desired length, the exposure aperture is closed again by turning the operating lever 95 from its position shown in Fig. 9 back into its position shown in Fig. 8: such turning will result in release of the operating pin 110 from the projection 97 and turning of the shutter 65 from its position shown in Fig. 9 into its position shown in Fig. 8 in which it is held by the operating pin 111 abutting against the projection 96 of lever 95. Thus, it is possible to obtain by different movements of the shutter operating lever 95 either motion picture exposures or instantaneous exposures or time exposures.

I wish to stress that various changes and variations might be made in cinematographic cameras of the above described type without departing in any way from the spirit of my present invention.

Thus, for instance, the observation opening or openings for observing the markings on the filter disc might be provided in one or both side walls of the camera housing instead of in the front wall thereof. In such case, the filter markings on the filter disc are arranged so as to pass along the observation opening or openings in the side wall of the camera housing. In order to enable their passage along the observation openings arranged in the side walls, they are preferably arranged along the edge of the filter disc normal to the plane thereof.

A further change which might be made without departing from the spirit of my present invention consists in mounting the turnable filter disc on the partition wall or a bridge secured thereto instead of mounting it on the removable front wall of the camera.

Furthermore, it is also possible to provide along the edge of the filter disc identical markings appearing on the projecting filter disc portion and corresponding to the filter located behind the lens being in picture taking position. In this connection, I wish to mention that it is usually not necessary that all apertures in the filter disc contain filter members but that it is advisable to leave one of the apertures in the filter disc open so as to make it possible to take pictures without any filter arranged behind the picture taking lens.

It should also be stressed that although I have mentioned above only spring means for operating the camera, I might also use for transporting the film and rotating the shutter an electric motor built into the camera in the usual way.

Finally, it should be mentioned that motion transmitting means, e. g. a gear train connecting the spring or electric motor operating the camera and the fading arrangement described above might also serve as stop means for automatically terminating operation of the camera at the end of a fading out period. Such automatic termination will be due to the fact that at the end of a fading out period the fading member cannot move farther preventing turning of the single gears of the gear train which in turn will block further movement of the film transporting means and of the spring or electric motor driving the same.

It will be understood that each of the elements described above, or two or more together, may also find a useful application in other types of cinematographic cameras differing from the types described above.

While I have illustrated and described the invention as embodied in cinematographic cameras provided with turret heads, I do not intend to be limited to the details shown, since various modifications and structural changes may be made without departing in any way from the spirit of my invention.

What I claim as new and desire to secure by Letters Patent is:

1. In a cinematographic camera of the type described in combination a camera housing having a front wall; an exposure aperture in said front wall; a fading member mounted within said camera housing movably to and fro past said exposure aperture in said front wall; and a longitudinal operating member mounted within said camera housing slidably in axial direction and constructed so as to engage said fading member and operate the same during its sliding movement; said longitudinal operating member having at both ends projecting end portions reaching through corresponding openings in said camera housing so that said longitudinal operating member and the fading member operated by the same can be moved by pushing against one or the other of said projecting end portions of said longitudinal operating member in axial direction of the same.

2. In a cinematographic camera of the type claimed in claim 1, hinge means connecting one of said projecting end portions with said longitudinal operating member so as to enable turning of said projecting end portion relative to said longitudinal operating member, thus preventing sliding movement of said longitudinal operating member while said projecting end portion is in bent position.

3. In a cinematographic camera of the type described in combination a camera housing having a front wall; an exposure aperture in said front wall; a fading member mounted within said camera housing movably to and fro past said exposure aperture in said front wall; a longitudinal operating member mounted within said camera housing slidably in axial direction and constructed so as to engage said fading member and operate the same during its sliding movement; a viewfinder arrangement provided with a viewfinder window forming part of said cinematographic camera; and an indicating member firmly secured to said longitudinal operating member and constructed so as to move during operations of said fading member by said longitudinal member behind said viewfinder window of said viewfinder arrangement, thus indicating in said viewfinder window the degree of fading obtained by said fading member.

4. In a cinematographic camera of the type described in combination a camera housing having a front wall; an exposure aperture in said front wall; a fading member mounted within said camera housing movably to and fro past said exposure aperture in said front wall; and a longitudinal operating member mounted within said camera housing slidable in axial direction and constructed so as to engage said fading member and operate the same during its sliding movement; said longitudinal operating member having at least at one end a projecting end portion reaching through a corresponding opening in said camera housing so that said longitudinal operating member and the fading member operated by the same can be moved by moving said projecting end portion of said longitudinal operating member in axial direction of the same.

JACQUES BOLSEY.

REFERENCES CITED

The following references are of record in the file of this patent:

UNITED STATES PATENTS

| Number | Name | Date |
| --- | --- | --- |
| 1,275,863 | Davis | Aug. 13, 1918 |
| 1,295,081 | Tartara | Feb. 18, 1919 |
| 1,398,952 | Tessier | Nov. 29, 1921 |
| 1,494,801 | Pittman | May 20, 1924 |
| 1,767,849 | Howell | June 24, 1930 |
| 1,830,121 | Merkel | Nov. 3, 1931 |
| 1,958,618 | Gilmore | May 15, 1934 |
| 1,960,062 | Morsbach et al. | May 22, 1934 |
| 1,977,134 | Lingg et al. | Oct. 16, 1934 |
| 2,065,993 | Billing | Dec. 29, 1936 |
| 2,217,718 | Ulano | Oct. 15, 1940 |
| 2,307,297 | Phillimore | Jan. 5, 1943 |
| 2,319,204 | Bolsey | May 18, 1943 |
| 2,451,017 | Adreancy | Oct. 12, 1948 |
| 2,462,302 | Bolsey | Feb. 22, 1949 |